(12) United States Patent
Reshetov et al.

(10) Patent No.: US 7,755,628 B2
(45) Date of Patent: Jul. 13, 2010

(54) METHOD AND APPARATUS FOR MULTI-LEVEL RAY TRACING

(75) Inventors: Alexander V. Reshetov, Saratoga, CA (US); Alexei M. Soupikov, Nizhny Novgorod (RU); James T. Hurley, Pleasanton, CA (US)

(73) Assignee: Intel Corporation, Santa Clara, CA (US)

( * ) Notice: Subject to any disclaimer, the term of this patent is extended or adjusted under 35 U.S.C. 154(b) by 787 days.

(21) Appl. No.: 11/648,116

(22) Filed: Dec. 29, 2006

(65) Prior Publication Data

US 2008/0158227 A1 Jul. 3, 2008

(51) Int. Cl.
*G06T 15/50* (2006.01)

(52) U.S. Cl. ............ 345/426; 345/419; 345/421; 345/423; 345/428; 382/132; 378/4; 378/19; 378/62; 348/E5.086

(58) Field of Classification Search ............... 345/419, 345/421, 423, 426; 382/132; 378/4, 62, 378/19, 901; 348/E5.086
See application file for complete search history.

(56) References Cited

U.S. PATENT DOCUMENTS 5,663,789 A 9/1997 Takagi
5,933,146 A 8/1999 Wrigley
7,098,907 B2 * 8/2006 Houston et al. ............ 345/419
7,495,664 B2 * 2/2009 Keller et al. ............... 345/426
7,548,238 B2 * 6/2009 Berteig et al. .............. 345/426
2005/0231508 A1 * 10/2005 Christensen et al. ........ 345/428
2009/0167763 A1 * 7/2009 Waechter et al. ........... 345/426
2009/0189898 A1 * 7/2009 Dammertz et al. ......... 345/426

FOREIGN PATENT DOCUMENTS

JP 06-187461 A 7/1994
WO 02099754 A1 12/2002

OTHER PUBLICATIONS

"PCT International Search Report of the International Searching Authority", mailed May 16, 2008, for PCT/US2007/087679, 4pgs.

\* cited by examiner

*Primary Examiner*—Kimbinh T Nguyen
(74) *Attorney, Agent, or Firm*—Buckley, Maschoff & Talwalkar LLC

(57) ABSTRACT

A method, apparatus, and system related to thermal management. The method includes generating a beam including a group of rays; evaluating the beam against a spatially ordered geometrical database until the beam can no longer be evaluated as a whole in order to discard a portion of the spatially ordered geometrical database from further consideration; noting the location where the beam can no longer be evaluated as a whole; and traversing, starting at the noted location, the spatially ordered geometrical database for each of the rays by executing a query against the spatially ordered geometrical database not discarded by the evaluating.

21 Claims, 3 Drawing Sheets

METHOD AND APPARATUS FOR MULTI-LEVEL RAY TRACING

BACKGROUND

Ray tracing is a graphics rendering technique that is becoming increasingly popular in a number of applications and contexts. For example, ray tracing may be used to compute a global illumination solution for a graphics scene. In general, ray tracing may be used in computer graphics to determine visibility by directing one or more rays from a vantage point described by the ray's position vector along a line of sight described by the ray's direction vector. To determine the nearest visible surface along that line of sight requires that the ray to be effectively tested for intersection against all of the geometry within the virtual scene and retain the nearest intersection.

However, determining the intersections of each ray with the geometries of a scene may be computationally complex and resource intensive, thereby limiting a real-time ray tracing solution.

DETAILED DESCRIPTION

In general, ray tracing involves tracking a trajectory of a ray through an acceleration structure (AS) that represents the distribution of objects in a scene. The AS may be a spatially ordered database representation of the objects in the scene. Embodiments herein provide for ray tracing traversal of an AS that relies on a beam traversing the AS, as opposed to a traversal based on each ray independently. The beam represents a collection or group rays. In some embodiments, the grouping of the rays is based on a commonality of shared characteristics of the rays comprising the beam. In some embodiments, the larger the collection or group of rays included in a beam, the greater the amortization of work per ray that may be gained by the processes and systems herein.

Figure 1:
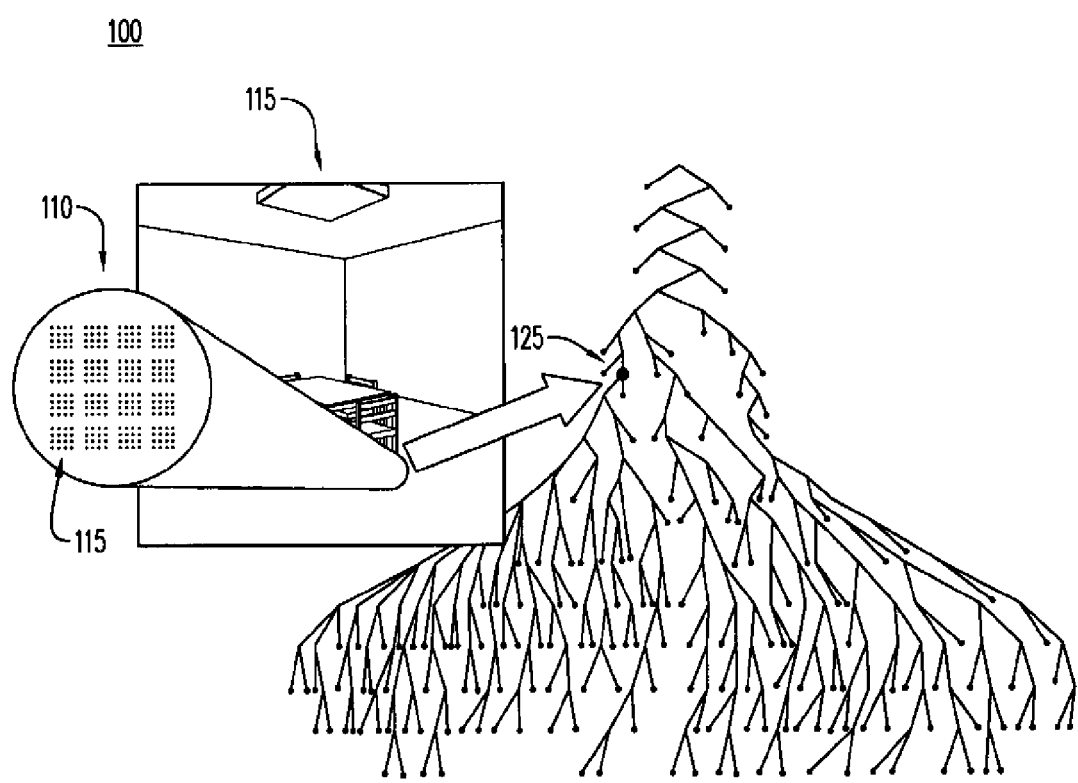
FIG. 1 is an exemplary illustration of a scene and a AS tree, in accordance herewith.

FIG. 1 is a depiction of an exemplary scene and an AS corresponding to the scene, in accordance with some embodiments herein. FIG. 1 includes a scene 105 and a beam 110 directed into the scene. Beam 110 comprises different groups of pixels 115 (e.g., sixteen). AS 120 is a representation of the geometry of scene 105. In an effort to determine the intersections of beam 110 with objects in scene 105, AS 120 is queried to determine the intersections of rays of beam 110 with the objects of scene 105 by traversing AS 120 from top to bottom. In accordance with embodiments herein, the beam is evaluated against AS to determine an entry point for the traversing of the AS.

In some embodiments, a beam may be sub-divided into sub-beams or individual rays in some embodiments, or on an as-needed basis in some other embodiments, as the evaluation of the beam descends through the hierarchy of AS 120.

In accordance with some embodiments herein, beam 110 includes a collection of reasonably coherent rays and the AS is traversed using the beam. As beam 110 descends through AS 120, a portion(s) of the AS is excluded from further consideration. The exclusion(s) removes from consideration that portion of the AS that will have no impact on the final results. That is, the part of the scene that does not have an impact on the beam (i.e., guaranteed not to include any intersections with the rays comprising the beam) are excluded from further consideration and the portion of the AS that remains to investigate becomes smaller and smaller.

The AS continues to be evaluated regarding the beam until a point 125 is reached where the entire beam may no proceed as a whole. This location or point is referred to herein as an entry point. Entry point 125 is noted or marked for further processing. Entry point 125 may indicate the point at which the AS 120 may be entered for each and every one of the rays inside beam 110. Each and every ray is then used to traverse AS since the beam as a whole cannot proceed through the AS. Each of the rays may be traced through AS 120 beginning at common entry point 125.

In some instances, entry point(s) indicating a starting point for the traversing of an AS for individual rays is not at the top of the AS structure but instead is further down the AS. Also, the evaluation of the beam against the AS includes excluding a portion of the AS that has no impact on the traversal results. Accordingly, the excluded portion of the AS need not be traversed for the beam. In this manner, the portion of the AS that is queried regarding the rays comprising the beam is preferably less than the entire AS 120. Likewise, the computational load used to process the traversal of AS 120 using the beam and traversal methodologies herein may be less than the computational load used to traverse the entire AS 120 using individual rays.

In some embodiments, the rays comprising a beam may each possess some common characteristics that correspond to a coherency amongst the rays grouped together to form the beam. In some embodiments, the group of rays included in a beam each have the properties of:

(i) For any given axis-aligned plane, a rectangle inside the plane can be computed that contains all possible ray/plane intersection points. The rectangle does not have to be tight fitting.

(ii) All rays are in the same direction (e.g., x, y, and z projections of ray directions have the same sign). Eq. 1

An exemplary process for determining a common entry point for a beam will now be discussed, in accordance with embodiments herein. The process is, in some aspects, a depth-first traversal of the visible nodes in the AS tree that allows for an escape from the traversal process upon encountering nodes that that will not contribute further to the final result of the traversal process.

At an initial step, an AS (e.g., 120) is traversed in depth-first order by using a frustum culling algorithm using a beam that, for example, complies with the equation (1) above. As the beam is evaluated at the binary nodes of the AS, all sub-nodes of the AS that are guaranteed not to intersect with the beam are excluded from further processing and consideration.

It is noted that any frustum culling algorithm may be used in this operation of the process.

Also, all bifurcation nodes of the AS are stored in a stack memory structure until the first leaf node with potential intersections is found. Bifurcation nodes are those nodes where both sub-cells are traversed. In some embodiments, the stack memory structure is a last-in-first-out mechanism. The first leaf node at which potential intersections are determined is marked, flagged, stored, or otherwise indicated as being a candidate entry point node.

The depth-first evaluation of the AS for the beam continues starting at the top-most node in the bifurcation stack. If yet another leaf node with potential intersections is encountered, this leaf node taken from the bifurcation stack will become the new candidate entry point.

The evaluation process of the beam regarding the AS tree ends and the current candidate entry point node is returned as an entry point in the instance (i) the bifurcation stack is empty, and (ii) all potential rays of the beam end inside the current leaf node. In the instance all of the potential rays of the beam end inside the current leaf node, two possible cases exist: Either (a) the leaf has some objects and all rays satisfying condition of equation (1) intersect with at least one of the objects inside the cell, or (b) the leaf is empty but is located inside some "watertight" object and all rays or beams satisfying equation (1) intersect the bounding box of this leaf.

It is noted that during the evaluation of the AS tree regarding the beam to determine the traversal entry point, finding specific ray and object intersections is not an objective since the rays in the beam group are not required to be defined at this stage of processing. What is sought is a potential for intersections. In particular, if an intersection with any ray satisfying the conditions of equation (1) cannot be excluded then the intersection may be considered a potential intersection.

Figure 2:
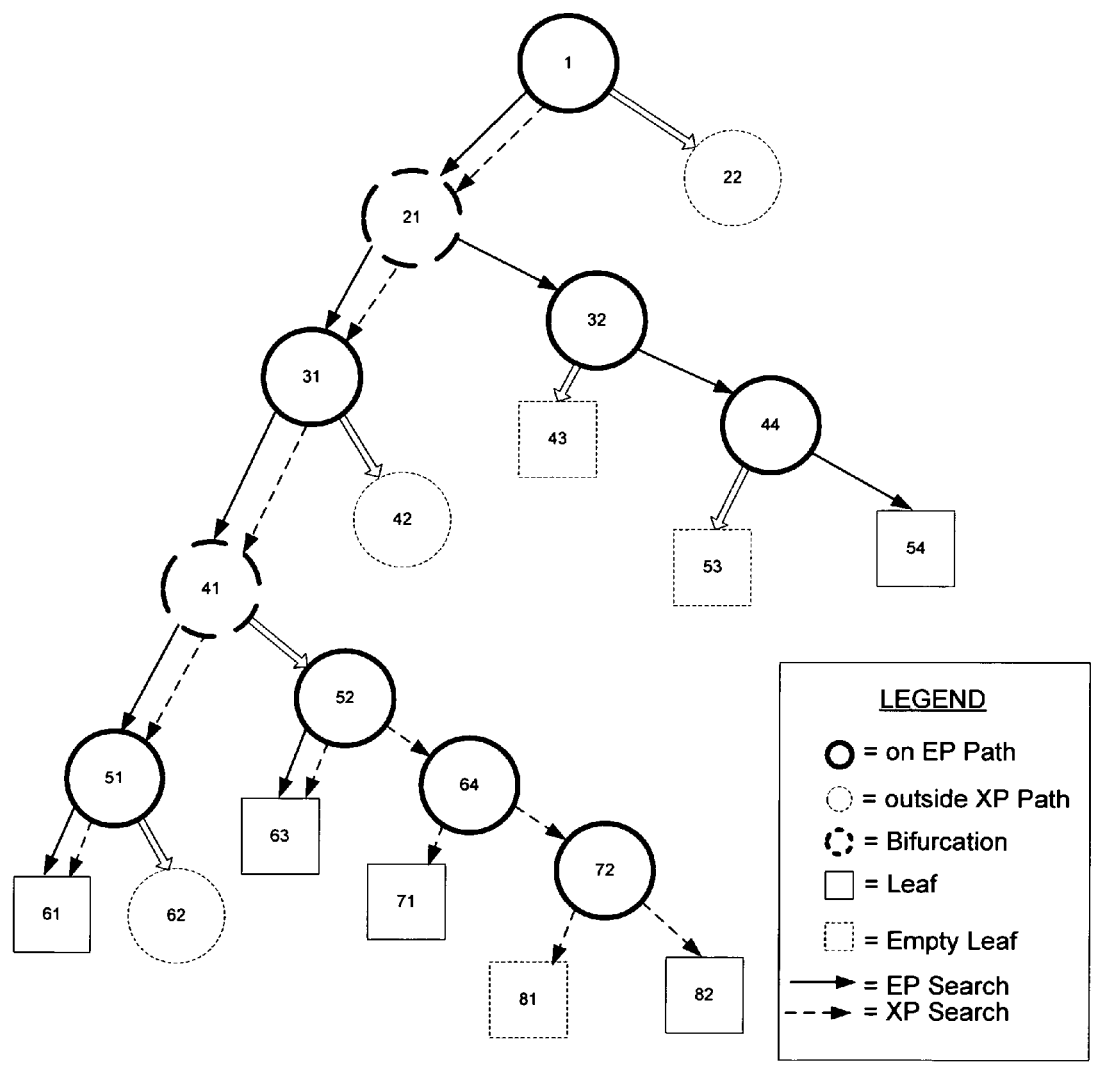
FIG. 2 is an illustrative AS tree, in accordance with some embodiments herein.

Referring to FIG. 2, an exemplary determination of an entry point for an AS 200 will be discussed. Starting at node 1 a beam adhering to the constraints of equation (1) is evaluated. Based on the conditions of equation (1), only the left sub-cell 21 has to be traversed. Both sub-cells 31 and 32 of node 21 have to be considered. Therefore, node 21 is a bifurcation node as discussed above. Bifurcation node 21 is stored in a bifurcation stack and processing proceeds to nodes 31 where the split to node 41 is ignored. The evaluation thus continues to node 41 which is also a bifurcation node and is stored in the bifurcation stack. At node 51 the split to node 62 is ignored.

At leaf node 61, a determination is made that there is a potential for intersections with leaf 61. Leaf 61 is the first leaf node with potential intersections. Leaf 61 is thus marked as a candidate entry point and the bifurcation stack is halted.

The depth-first evaluation of the AS continues at the topmost node in the bifurcation stack. Node 41 is next considered since the bifurcation stack has a last-in-first-out structure. Node 41 is taken from the bifurcation stack and the depth-first traversal continues with nodes 52 and 63. Leaf node 63 has a potential for intersections, so node 41 is marked as a candidate entry point and the processing of the sub-tree starting at node 64 is abandoned.

The next node in the bifurcation stack, node 21, is then removed and evaluated. From node 21 the evaluation proceeds to node 32 that has sub-nodes 43 and 44. Node 43 is ignored because it is empty and node 44 is taken. Node 44 has two leaves, leaf 53 and leaf 54. Leaf 53 is ignored and leaf 54 is judged to have potential intersections. Therefore, node 21 is marked as being a candidate entry point.

Node 21 is returned as the entry point since the bifurcation stack is empty. All of the rays in the beam bound by equation (1) may now start the traversal of AS tree 200 at node 21.

FIG. 2 includes an indication of the nodes on the entry point (EP) search path and the nodes included on the intersection point (XP) search path. It is noted that there are dissimilarities between the two traversal processes since, for example, one is a search for a common EP for a beam and the other is a traversal through the tree from this entry point for each of the rays in the beam looking for ray/triangle XP. For example, at node 21, the XP traversal process is able to exclude node 32 from further processing since all the rays in the beam are now known and they intersect only with cell 31 from node 21. However, the EP traversal process uses frustum properties that might (i.e., potentially) intersect with node 32 and therefore traversal of both nodes 31 and 32 on behalf of the beam in search of entry points is required.

The EP traversal process ignores node 64 when it reaches its parent node 52 because it node 52 will have no effect on the selection of the beam's entry point. The XP traversal process however must continue the traversal of nodes 64, 71, 72, 81, and 82 because there may be some intersections to be found in nodes 64, 71, 72, 81, and 82.

In this manner, the EP traversal process to determine an entry point is shown to disregard non-contributing branches. This discarding of portions of the AS from further consideration on behalf of all the rays in the beam may effectively reduce the overall computations otherwise performed per ray.

In some embodiments, the original beam 110 may be further sub-divided and continued traversing may be accomplished using the sub-divided beams against the AS to determine multiple sub-beam entry points or a lowest common entry point for all the sub-beams.

By doing this with a beam representing, for example, a 4×4 cross section of rays, amortization of the traversal cost may be reduces to $1/16$ per ray. Additionally, Applicant has realized that the entry point for the beam is either at or very close to the leaf node where the triangles are stored or referred to. Also, by traversing the AS using the beam the overall platform requirements are primarily computationally intensive, as opposed to being from being sequential memory reference intensive with ray traversal processes.

In some embodiments, the multi-level ray tracing methods herein may be implemented and supported in hardware and/or software embodiments. In some embodiments, a reduction of power consumed by a device, as well as increase overall performance may be gained as compared to traditional ray tracing techniques using traversing rays from the top to the bottom of an AS.

Ray tracing is based on massively parallel geometrical queries, executed against some spatially ordered geometrical database. The interval traversal algorithm may be extended to cover other types of applications, where it may be possible to find and trace certain group properties against a specialized database. One skilled in the art will recognize that embodiments of the disclosure are not limited to floating point implementation. Rather, the embodiments of the invention may be implemented using various data types, including but not limited to integer, fixed point and so forth.

In some embodiments, it may be desired to group certain rays together (e.g., in a beam). In some embodiments of an interval traversal algorithm herein, each group may be represented by a distance interval [t0,t1]. Initially, t0 is set to the minimum of all distances from the ray origins to the entry points into the bounding box of a whole model.

Figure 3:
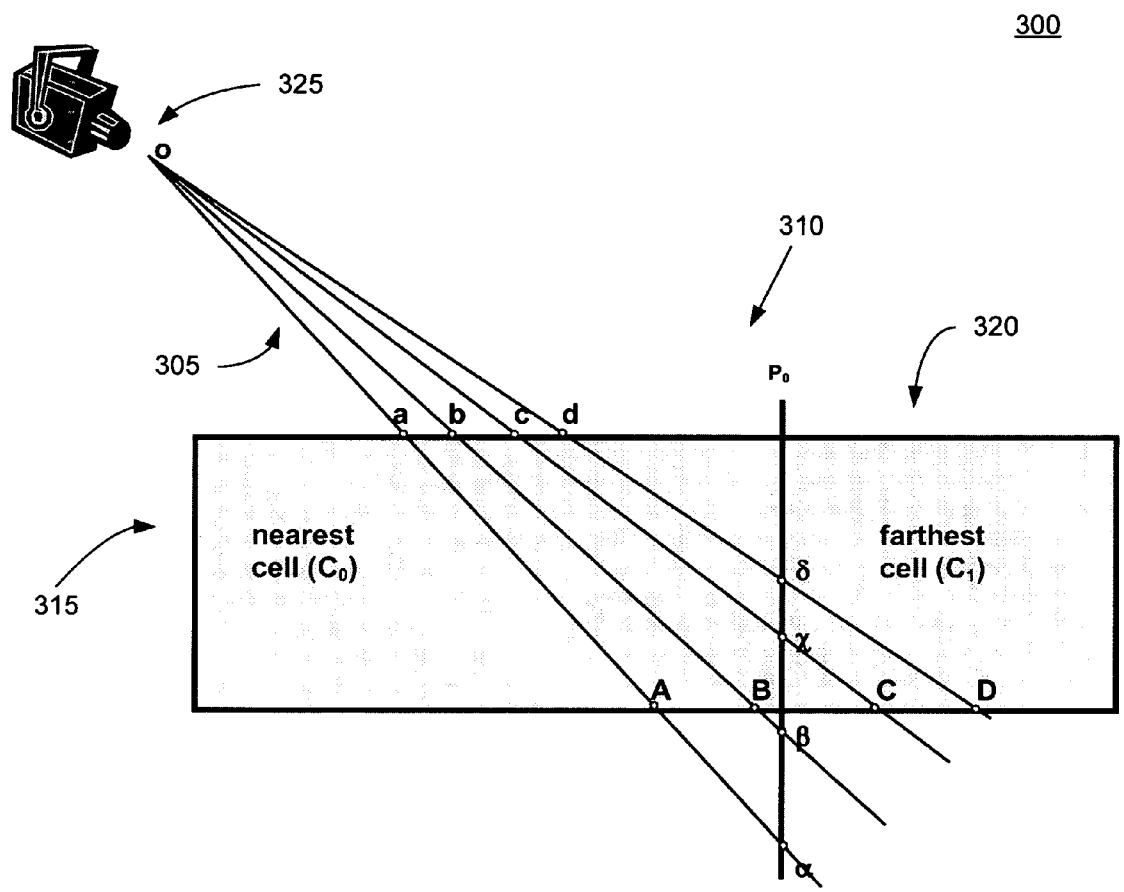
FIG. 3 is an illustrative example of a ray projected through a cell, in accordance with some embodiments herein.

FIG. 3 depicts an example of a beam from a common origin traced through a cell. Beam 305 comprises multiple rays traced through cell 310. Cell 310 is split by plane p0 into two sub-cells, including a nearest cell c0 (315) and a farthest cell c1 (320). Per FIG. 3, t0 is the minimum of distances [oa], [ob], [oc], and [od], which is [oa]. Similarly, t1 is set to the maximum distance of all of the exit points. Accordingly, t1 is [oD]. In addition to interval [t0, t1] interval, six additional values are used. These values include [r0[k], r1 [k]], where each k =0,1,2 (i.e., x, y, z directional vectors). For example, if the rays in a packet or beam have directions ray[i][k ], i=0, 1 . . . n, where n is total number of rays, then r0[k] and r1 [k] may be computed as follows:

```
if (ray[0][k] > 0) {
    r0[k] = min(1/ray[i][k]),   i=0...n
    r1[k] = max(1/ray[i][k]),   i=0...n
} else {
    r0[k] = max(1/ray[i][k]),   i=0...n
    r1[k] = min(1/ray[i][k]),   i=0...n
}
```

A floating point interval traversal algorithm (FITA) requires that for each k, all ray[i][k] values have the same sign (i.e., either positive or negative). For positive directions, r0[k] is computed by inverting the k-th component of the directions of all of the rays in the group and determining the minimum among them (the maximum for r1[k]). Values are swapped for negative directions.

In some embodiments, at each traversal step, the interval [t0,t1] is used to make a decision about the traversal order and then updated (narrowed to the current box). Assuming that all rays have one common origin o[k] and that the current cell is split along the axis k by plane p, this decision is based on computing the following two floating point values:

$$d0 = (p - o[k]) * r0[k];$$

$$d1 = (p - o[k]) * r1[k]; \quad \text{Eq. 2}$$

By comparing the values of d0, d1, t0, and t1, a decision is made whether to traverse only the nearest, only the farthest or both sub-cells. The interval [t0, t1] is then updated accordingly by using the values [d0, d1].

By using the approach described above to keep all directions positive or negative, values d0 and d1 defined in Eq. 2 are equal to the minimum and maximum distances to the plane for the group (beam) of rays.

In some embodiments herein, an integer variant of an interval traversal algorithm (IITA) is based upon an observation that it is acceptable to make a wrong decision during a traversal step, so long as the error is made on the side of caution (e.g., deciding to traverse both sub-cells when rays really only intersect one of the sub-cells). In some embodiments, a trade-off may be made between more computations and speed of processing when a significant speed advantage may be obtained.

Applicant has also realized that simultaneously scaling of all d0, d1, t0, and t1 values will not change either in traversal algorithm's speed or accuracy.

It is noted that while using integer arithmetic, a desired solution should provide accurate calculations and avoid integer overflow.

In order to maintain accuracy, the usage of large integer numbers may be used since, for example, the relative difference between 10000 and 10001 is less than the difference between 15 and 16. However, in order to avoid numerical overflow, smaller numbers would be better. To pursue these two pursuits simultaneously, two scaling factors are introduced, where INT_MAX is the maximum integer number that can be represented. (INT_MAX may correspond to a system or device specification)

$$modelScale = 0.5 * sqrtf(INT\_MAX)/max(\text{of all top bounding box coordinates}); \text{ and}$$

$$packetScale = sqrt(INT\_MAX)/max(r0[0], r0[1], r0[2], r1[0], r1[1], r1[2]);$$

Accordingly, all split values p in the AS (kd-tree) may be changed to an integer representation pint by using the following transformation:

$$pint = floor(p * modelScale);$$

The transformation may be done while the AS tree is created (or anoth pre-processing operation). A similar scaling transformation may be applied to a camera position values o[k] such as the following:

$$oint[k] = ceil(o[k] * modelScale);$$

By definition, floor(v) returns the biggest integer that is smaller than v and ceil(v) returns the smallest integer that is bigger than v. From this definition the next two inequalities follow:

$$pint - oint[k] < modelScale * (p - o[k])$$

$$(pint - oint[k]) + 2 > modelScale * (p - o[k]) \quad \text{Eq. 3}$$

By using the floor and cell functions, an integer interval is created that contains a scaled float value. The pint and oint[k] calculations can be done once per frame or when the camera position is changed.

The values of [r0[k], r1[k]] may be converted to integers using the packetScale scaling factor. However, a distinction is made between the cases of positive and negative r0[k] directions:

```
if (r0[k] > 0) {
    rint0[k] = floor(r0[k] * packetScale);
    rint1[k] = ceil (r1[k] * packetScale);
} else {
    rint0[k] = ceil (r0[k] * packetScale);
    rint1[k] = floor(r1[k] * packetScale);
}
``` where packetScale may be computed at the same time that the packet's rays are created, i.e. outside the main traversal loop.

By inserting integer equivalents into Eq. 2, guaranteed and accurate intervals may not be assured since some information may be lost during the float-to-integer conversion. However, by using Eq. 3, Eq. 2 may be rewritten as follows (integer interval traversal algorithm):

```
if (rint0[k] > 0) {
    // Both factors are positive
    dint0 = (pint - oint[k]    ) * rint0[k];
    dint1 = (pint - oint[k] + 2) * rint1[k];
} else {
    // Both factors are negative
    dint0 = (pint - oint[k] + 2) * rint0[k];
    dint1 = (pint - oint[k]    ) * rint1[k];
}
```

By definition, all pint values are less than 0.5*sqrtf(INT_MAX), and for a camera inside the scene, the oint values are also bounded by 0.5*sqrtf(INT_MAX. This guarantees that the expression (pint−oint[k]) is less than sqrtf(INT_MAX). Since all rint0[k] and rint1[k]values are also bounded by the same value, dint0 and dint1 will not exceed INT_MAX. For those scenes in which the camera can move outside the model boundaries, modelScale may be modified accordingly.

By analyzing the integer interval traversal algorithm, it is noted that the floating point interval packetScale*modelScale*[d0, d1] is always inside the integer interval [dint0, dint1]. This fact guarantees that by using the IITA, the traversing of only one sub-cell when the FITA would require traversing both sub-cells is avoided. However, there may be some situations where the IITA would call for traversing both sub-cells while FITA is able to use only one. However, this does not cause any problems per se, even though some extra traversal steps may be executed. In this manner, performance improvement may be possible by using only integer operation if the gains due to the simpler traversal processing thereof outweighs the overhead caused by the unnecessary traversal steps. Applicant has realized, for example, additional overhead of between 0.1% to 4.0%.

It should be appreciated that the IITA processes disclosed herein may be used in combination with or separately from the multi-level ray tracing aspects of the present disclosure.

The foregoing disclosure has been described with reference to specific exemplary embodiments thereof. In some embodiments, the methods disclosed herein may be implemented by a computer. Some embodiments include a medium storing computer-readable instructions that when executed by a computer perform a method, such as, the methods disclosed herein. It will, however, be evident that various modifications and changes may be made thereto without departing from the broader spirit and scope set forth in the appended claims.

What we claim is:

1. A computer-implemented method, the method comprising:
   generating, by a computer, a beam including a group of rays;
   evaluating, by the computer, the group of rays as a whole against a spatially ordered geometrical database until the beam can no longer be evaluated as a whole against the spatially ordered geometrical database in order to discard a portion of the spatially ordered geometrical database from further evaluating;
   noting, by the computer, the location in the spatially ordered geometrical database where the group of rays as a whole can no longer be evaluated as a whole;
   traversing, starting at the noted location in the spatially ordered geometrical database by the computer, the spatially ordered geometrical database for each of the rays in the group of rays in the beam by executing a query against the spatially ordered geometrical database not discarded by the evaluating; and
   providing an output of the traversing.

2. The method of claim 1, wherein the group of rays comprising the beam have the properties of:
   for any given axis-aligned plane a rectangle may be computed inside the plane that contains all possible ray and plane intersection points; and
   all projections for the rays have the same directional sign.

3. The method of claim 1, wherein the evaluating of the group of rays against the spatially ordered geometrical database comprises determining whether the group of rays as a whole intersects a sub-node of the spatially ordered geometrical database, wherein the sub-node is discarded in the instance there are no intersections.

4. The method of claim 1, further comprising:
   subdividing the beam including the group of rays into subdivided beams and traversing the spatially ordered geometrical database for the subdivided beams; and
   evaluating the subdivided beams against the spatially ordered geometrical database until the subdivided beams can no longer each be evaluated as a whole in order to discard from consideration a portion of the spatially ordered geometrical database for further consideration.

5. The method of claim 4, wherein at least one of the subdivided beams includes a group of rays.

6. The method of claim 4, further comprising traversing the spatially ordered geometrical database for each of the rays in the subdivided beams by executing a query against the spatially ordered geometrical database not discarded.

7. The method of claim 1, wherein the evaluation is performed using integer interval arithmetic.

8. A medium having computer-readable instructions stored thereon, the medium comprising:
   instructions to generate a beam including a group of rays;
   instructions to evaluate the group of rays as a whole against a spatially ordered geometrical database until the beam can no longer be evaluated as a whole against the spatially ordered geometrical database in order to discard a portion of the spatially ordered geometrical database from further evaluating;
   instructions to note the location in the spatially ordered geometrical database where the group of rays as a whole can no longer be evaluated as a whole;
   instructions to traverse, starting at the noted location in the spatially ordered geometrical database, the spatially ordered geometrical database for each of the rays in the group of rays in the beam by executing a query against the spatially ordered geometrical database not discarded by the evaluating; and
   providing an output of the traversing.

9. The medium of claim 8, wherein the group of rays comprising the beam have the properties of:
   for any given axis-aligned plane a rectangle may be computed inside the plane that contains all possible ray and plane intersection points; and
   all projections for the rays have the same directional sign.

10. The medium of claim 8, wherein the evaluating of the group of rays as a whole against the spatially ordered geometrical database comprises determining whether the group of rays as a whole intersects a sub-node of the spatially ordered geometrical database, wherein the sub-node is discarded in the instance there are no intersections.

11. The medium of claim 8, further comprising instructions to cause a machine to:
   subdivide the beam including the group of rays into subdivided beams and traversing the spatially ordered geometrical database for the subdivided beams; and
   evaluate the subdivided beams against the spatially ordered geometrical database until the subdivided beams can no longer each be evaluated as a whole in order to discard from consideration a portion of the spatially ordered geometrical database for further consideration.

12. The medium of claim 11, wherein at least one of the subdivided beams includes a group of rays.

13. The medium of claim 11, further comprising traversing the spatially ordered geometrical database for each of the rays in the subdivided beams by executing a query against the spatially ordered geometrical database not discarded.

14. The medium of claim 8, wherein the evaluation is performed using integer interval arithmetic.

15. A system comprising:
   a memory including a database; and
   a controller connected to the memory, wherein the controller is operable to:
   generate a beam including a group of rays;
   evaluate the group of rays as a whole against a spatially ordered geometrical database until the beam can no longer be evaluated as a whole against the spatially ordered geometrical database in order to discard a portion of the spatially ordered geometrical database from further evaluating;

note the location in the spatially ordered geometrical database where the group of rays as a whole can no longer be evaluated as a whole;

traverse, starting at the noted location in the spatially ordered geometrical database, the spatially ordered geometrical database for each of the in the group of rays in the beam by executing a query against the spatially ordered geometrical database not discarded by the evaluating; and providing an output of the traversing.

16. The system of claim 15, wherein the group of rays comprising the beam have the properties of:

for any given axis-aligned plane a rectangle may be computed inside the plane that contains all possible ray and plane intersection points; and all projections for the rays have the same directional sign.

17. The system of claim 15, wherein the evaluating of the group of rays as a whole against the spatially ordered geometrical database comprises determining whether the group of rays as a whole intersects a sub-node of the spatially ordered geometrical database, wherein the sub-node is discarded in the instance there are no intersections.

18. The system of claim 15, further comprising instructions to cause a machine to:

subdivide the beam including the group of rays into subdivided beams and traversing the spatially ordered geometrical database for the subdivided beams; and evaluate the subdivided beams against the spatially ordered geometrical database until the subdivided beams can no longer each be evaluated as a whole in order to discard from consideration a portion of the spatially ordered geometrical database for further consideration.

19. The system of claim 18, wherein at least one of the subdivided beams includes a group of rays.

20. The system of claim 18, further comprising traversing the spatially ordered geometrical database for each of the rays in the subdivided beams by executing a query against the spatially ordered geometrical database not discarded.

21. The system of claim 15, wherein the evaluation is performed using integer interval arithmetic.

* * * * *